US011130536B2

(12) United States Patent
Hosbach et al.

(10) Patent No.: US 11,130,536 B2
(45) Date of Patent: Sep. 28, 2021

(54) METHOD OF ASSEMBLING VEHICLE INCLUDING AN INTEGRATED INTERIOR MODULE AND TOP-HAT

(71) Applicant: Ford Global Technologies, LLC, Dearborn, MI (US)

(72) Inventors: Christian Hosbach, Taylor, MI (US); Ari Caliskan, Canton, MI (US); John Jaranson, Dearborn, MI (US); Christopher Bondanza, Grosse Pointe Shores, MI (US); Jonathan Weiler, Detroit, MI (US); Peter A. Friedman, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 157 days.

(21) Appl. No.: 16/190,284

(22) Filed: Nov. 14, 2018

(65) Prior Publication Data

US 2020/0148292 A1  May 14, 2020

(51) Int. Cl.
*B62D 65/04* (2006.01)
*B62D 65/14* (2006.01)
*B62D 25/20* (2006.01)
*B62D 65/02* (2006.01)

(52) U.S. Cl.
CPC ......... *B62D 65/04* (2013.01); *B62D 25/2009* (2013.01); *B62D 65/024* (2013.01); *B62D 65/14* (2013.01); *B23P 2700/50* (2013.01)

(58) Field of Classification Search
CPC .... B62D 65/04; B62D 65/14; B62D 25/2009; B62D 65/024; B62D 63/025; B62D 65/02; B23P 2700/50
See application file for complete search history.

(56) References Cited

U.S. PATENT DOCUMENTS

| 4,759,489 A * | 7/1988 | Pigott ................. B62D 27/065 228/102 |
|---|---|---|
| 6,918,169 B2 | 7/2005 | Mathew |
| 7,635,156 B2 | 12/2009 | Thomas et al. |
| 9,108,692 B2 | 8/2015 | Gandini |
| 9,302,723 B1 * | 4/2016 | Pollitzer ................ B60K 17/04 |
| 10,501,134 B2 * | 12/2019 | Erlacher ................ B62D 65/06 |
| 2016/0068195 A1 * | 3/2016 | Hentrich ............ B62D 25/2036 180/68.5 |

FOREIGN PATENT DOCUMENTS

| DE | 2923874 | 1/1981 |
| WO | 2012084084 | 6/2012 |

OTHER PUBLICATIONS

Kelly, K.M., Ford: Putting on the Top Hat, AD&P Automotive Design & Production, Jan. 1, 2009, available at URL https://www.adandp.media/articles/ford-putting-on-the-top-hat.

* cited by examiner

*Primary Examiner* — Sarang Afzali
(74) *Attorney, Agent, or Firm* — Burris Law, PLLC

(57) ABSTRACT

A vehicle assembly method includes assembling a chassis platform, mounting a floor pan to the platform, mounting a modular interior to the floor pan, assembling a body top-hat separate from the platform and the floor pan, and mounting the body top-hat to the platform and the floor pan after mounting the modular interior to the floor pan.

9 Claims, 2 Drawing Sheets

METHOD OF ASSEMBLING VEHICLE INCLUDING AN INTEGRATED INTERIOR MODULE AND TOP-HAT

FIELD

Figure 1:
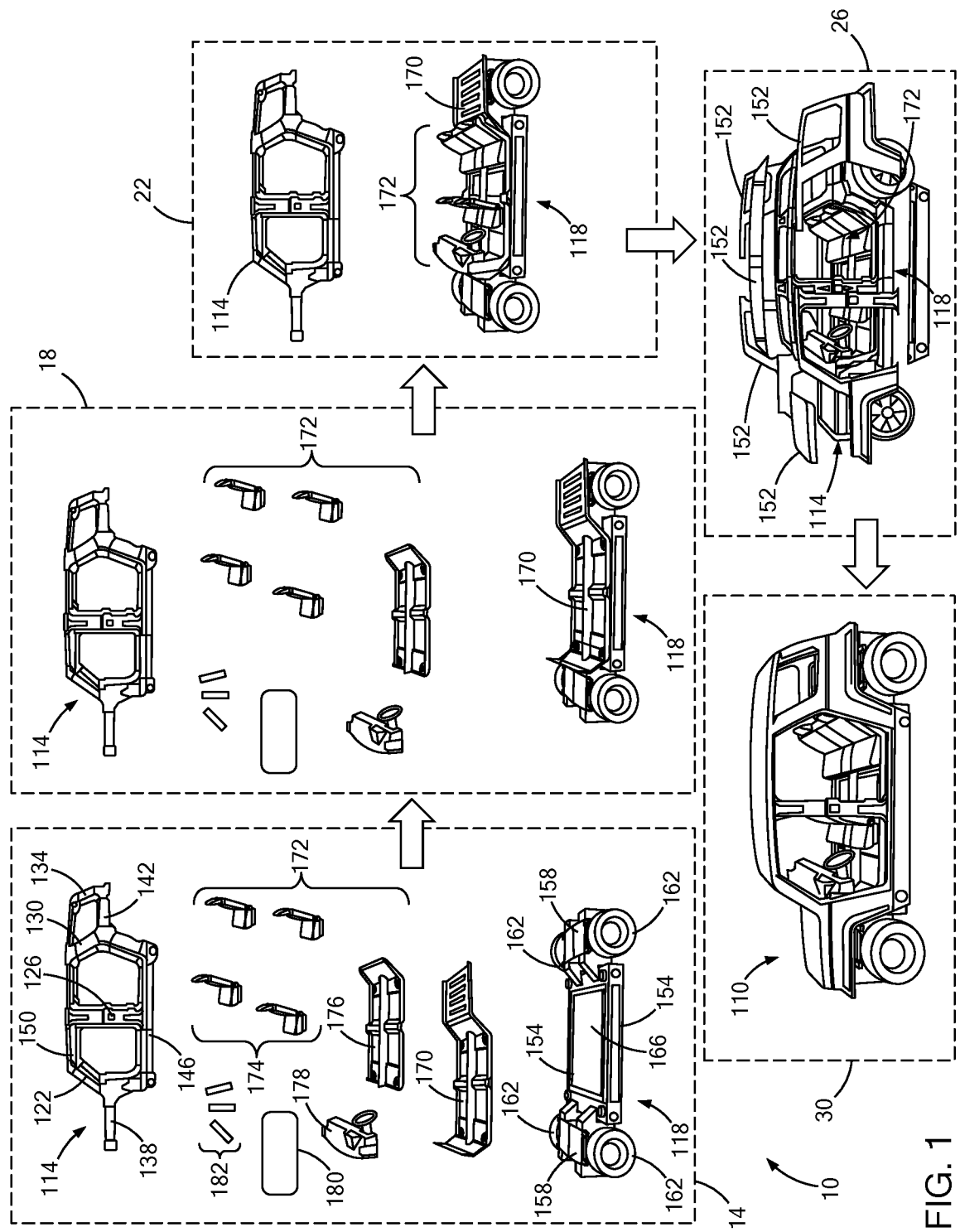

The present disclosure relates to a method of assembling a vehicle.

BACKGROUND

The statements in this section merely provide background information related to the present disclosure and may not constitute prior art.

Assembling a vehicle, especially mass produced vehicles, requires many steps that must be performed in specific orders in order for all pieces to fit and be assembled efficiently. Body-on-frame vehicles are typically assembled by building the full body and full frame separately. The body, including the floor pan, side panels, front and rear body components, and roof are fully assembled, then mounted to the frame. In some vehicles, the engine and some of the driveline components are mounted to the frame before the body, while they can be mounted after the body in other vehicles. The interior components, such as the seats, the dash panel, the headliner, the upper and lower interior trim, and the floor carpeting are then inserted through the door opening and installed into the full body after the body is mounted to the frame.

On Uni-body type vehicles, the uni-body structure is fully assembled, including the floor pan, vehicle sides, front, rear, and roof. Similar to the body-on-frame vehicles, the interior components are inserted through the door openings and assembled to the pre-assembled uni-body structure from within the structure.

The typical vehicle assembly process limits the size and shape of interior components and assembly tools to those that fit through the door or roof openings. Such constraints drive the design of the entire vehicle and reduce the opportunity for modularity of interior components such as HVAC, instrument panel, seats, center console, etc. These design constraints also drive up cost and complexity in the assembly process.

These issues related to the assembly of vehicles are addressed by the present disclosure.

SUMMARY

In one form, a vehicle assembly method includes assembling a chassis platform, mounting a floor pan to the platform, mounting a modular interior to the floor pan, assembling a body top-hat separate from the platform and the floor pan, and mounting the body top-hat to the platform and the floor pan after mounting the modular interior to the floor pan. In a variety of alternate forms of the present disclosure: the modular interior is mounted to the floor pan before the floor pan is mounted to the platform; the modular interior is mounted to the floor pan after the floor pan is mounted to the platform; the modular interior including at least one component selected from the group of: a seat, a carpet, and an instrument panel; the modular interior includes an instrument panel; the modular interior includes a carpet, an instrument panel, and a plurality of seats; mounting an upper interior component to the body top-hat before mounting the body top-hat to the platform and the floor pan, the upper interior component including at least one of a headliner, an airbag, and a finish trim piece; the vehicle is an electric vehicle and the method further comprises mounting a plurality of electric storage devices to the platform before mounting the floor pan to the platform; mounting a plurality of electric motors to the platform; the body top-hat is a space frame; coating the floor pan with a corrosion resistant coating before mounting the body top-hat to the platform and the floor pan.

In another form, a vehicle assembly method includes assembling a chassis platform, mounting a floor pan to the platform, mounting a lower interior component to the floor pan, assembling a body top-hat separate from the platform and the floor pan, mounting an upper interior component to the body top-hat, and mounting the body top-hat to the platform and the floor pan after mounting the lower interior component and the upper interior component. In a variety of alternate forms of the present disclosure: the lower interior component is mounted to the floor pan before the floor pan is mounted to the platform; the lower interior component is mounted to the floor pan after the floor pan is mounted to the platform; the step of mounting the lower interior component includes mounting at least one of a seat, a carpet, and an instrument panel to the floor pan; the step of mounting the lower interior component includes mounting a carpet, an instrument panel, and a plurality of seats to the floor pan; the step of mounting the upper interior component includes mounting at least one of a headliner, an airbag, and a finish trim piece to the body top-hat; the vehicle is an electric vehicle and the method further comprises mounting a plurality of electric storage devices to the platform before mounting the floor pan to the platform; the body top-hat is a space frame; coating the floor pan with a corrosion resistant coating before mounting the body top-hat to the platform and the floor pan.

Further areas of applicability will become apparent from the description provided herein. It should be understood that the description and specific examples are intended for purposes of illustration only and are not intended to limit the scope of the present disclosure.

DRAWINGS

Figure 2:
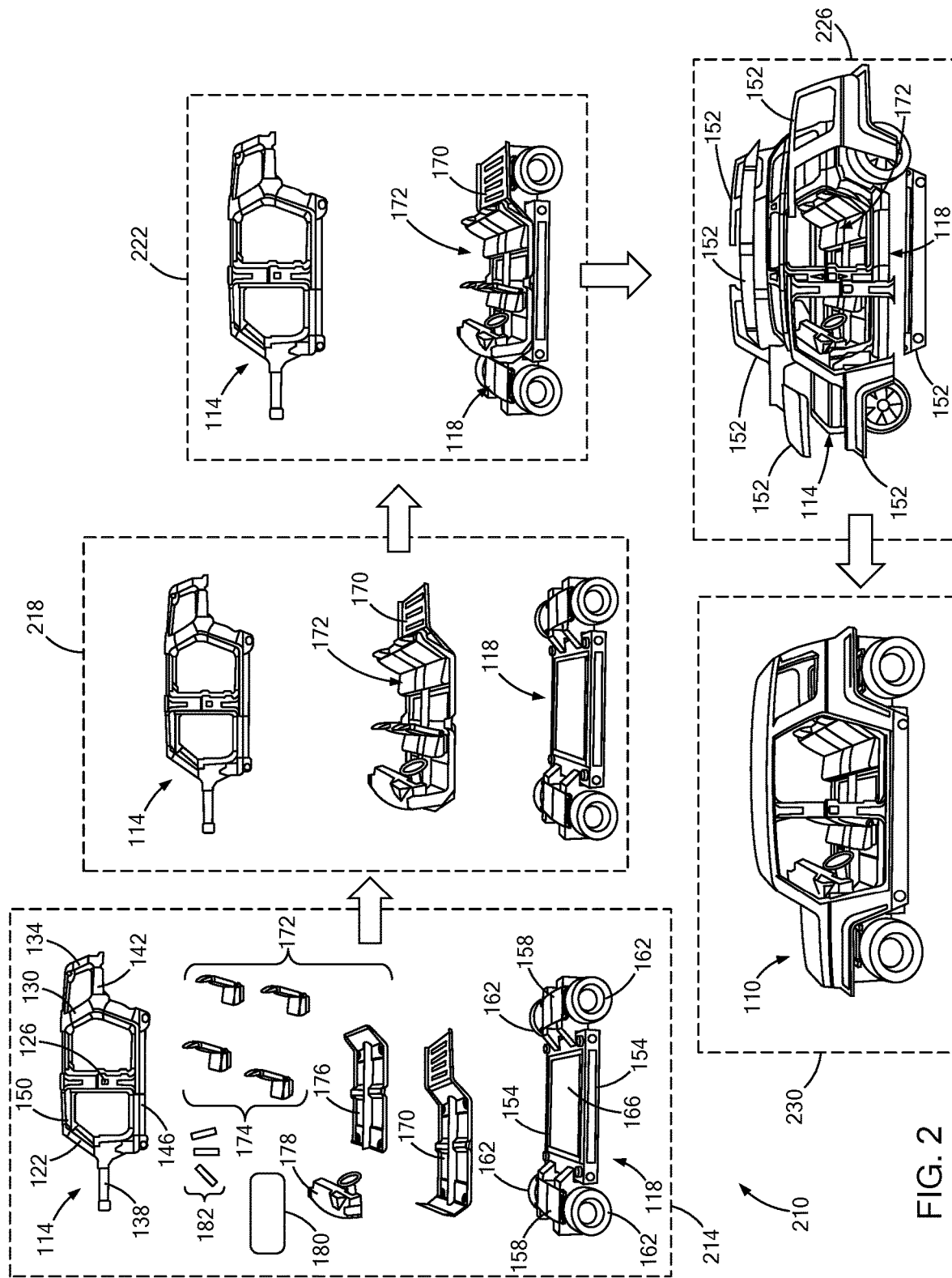

In order that the disclosure may be well understood, there will now be described various forms thereof, given by way of example, reference being made to the accompanying drawings, in which:

FIG. 1 is a flow chart illustrating the steps of a method of assembling a vehicle in accordance with the teachings of the present disclosure; and FIG. 2 is a flow chart illustrating the steps of a second method of assembling the vehicle of FIG. 1 in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a method 10 of assembling a vehicle 110 is illustrated in flow chart format. The method 10 starts at step 14. At step 14, a body top-hat 114 is assembled and a chassis platform 118 (also referred to as a skateboard platform) is assembled separate from the body top-hat 114.

For example, the body top-hat 114 and chassis platform 118 can be assembled on separate assembly lines. The body top-hat 114 is a spaceframe that includes body structural members (e.g., A-pillar 122, B-pillar 126, C-pillar 130, D-pillar 134, front and rear longitudinal members 138, 142, sill members 146, and roof rail members 150). The body structural members generally form the sides, front, rear, and top of the body and final body panels 152 (e.g., hood, trunk or hatch cover, fenders, outer pillar members, outer sill members, outer rail members, and roof panel) can be attached to define the visible class-A surfaces of the outer surface of the vehicle 110. The exact number and location of the final body panels can depend on the architecture of the vehicle 110. In some configurations, one or more of the body structural members of the body top-hat 114 can have an integral class-A surface to define the visible outer surface of the vehicle 110.

The chassis platform 118 includes vehicle frame members 154 configured to support the drivetrain. In the example provided, the vehicle 110 is an electric vehicle and the drivetrain includes at least one electric motor 158 supported by the frame members 154 and configured to provide torque to wheels 162 of the vehicle 110. The frame members 154 also support the vehicle's electric power storage unit 166 (e.g., electric vehicle battery pack or super capacitor pack) in a central frame cavity disposed between the front and rear wheels 162. The central frame cavity can be defined by left and right frame sills and lateral frame members that extend between the left and right frame sills. In the example provided, the wheels 162, motors 158, and electric power storage unit 166 are all assembled to the frame members 154 during step 14. Alternatively, some or all of these components (wheels 162, motors 158, electric power storage unit 166) can be assembled to the frame members 154 during a subsequent step.

At step 14, a vehicle floor pan 170 and various internal components 172 can also formed separately from the chassis platform 118. In the example provided, the internal components 172 can be finish level components and include seats 174, a carpet sheet 176, a dash panel assembly 178, a headliner 180, and various finish trim components such as pillar trim 182. While not specifically shown, the interior components 172 can also include components such as heating, ventilation and air conditioning (HVAC) components, a center console, airbags, etc. The floor pan 170 defines front and rear foot wells and is configured to provide the structure for the entire floor of the passenger and cargo areas of the vehicle 110 and to structurally separate the interior of the vehicle 110 from the electric storage unit 166. In the example provided, the floor pan 170 is formed from stamped sheet metal, though other configurations or materials (e.g., composites) can be used. The method 10 of assembling the vehicle 110 proceeds from step 14 to step 18.

At step 18, the floor pan 170 is securely mounted to the chassis platform 118. The floor pan 170 can be mounted to the frame members 154 via any suitable attachment process, such as bolts (not shown), adhesives, and/or welding. The floor pan 170 covers the entire top of the central frame cavity to cover the top of the electric power storage unit 166 and, in the example provided, extends over the rear wheels 162 to form a floor of a trunk or cargo area of the vehicle 110. In the example provided, the floor pan 170 also defines a support panel or members that extend upwards from the front foot well and is configured to support the dash panel assembly 178. At step 18, the body top-hat 114 and various interior components 172 are still separate from the assembly of the chassis platform 118 and the floor pan 170. In the example provided, the body top-hat 114 undergoes e-coating with a corrosion resistive coating during step 18. The method 10 of assembling the vehicle 110 proceeds from step 18 to step 22.

At step 22, the interior components 172 that are considered lower interior components are assembled onto the floor pan 170 while the body top-hat 114 remains separate. In the example provided, the carpet sheet 176 is positioned over the foot wells of the floor pan 170, the front and rear seats 174 are then attached to the floor pan 170, such as through openings in the carpet sheet 176, and the dash panel assembly 178 is attached to the floor pan 170 and/or the chassis platform 118. In the example provided, the interior components 172 that are considered upper interior components are also assembled onto the body top-hat 114 while the body top-hat 114 is separate from the chassis platform 118 at step 22. For example, the headliner 180 is inserted into the body top-hat 114 through the opening in the bottom of the body top-hat 114 (i.e., between the left and right sills 146) and attached to the upper portion of the body top-hat 114 to form the ceiling of the vehicle 110. In the example provided, the pillar trim 182 is also attached to the corresponding pillars 122, 126, 130, 134 of the body top-hat 114 while the body top-hat 114 is separate from the chassis platform 118. In an alternative construction, not specifically shown, the dash panel assembly 178 can be considered an upper interior component and inserted through the bottom opening of the body top-hat 114 and then attached to the body top-hat 114 instead of being attached to the floor panel 170 and/or the chassis platform 118. Returning to the example provided, the method 10 then proceeds to step 26.

At step 26, the body top-hat 114, including the upper interior components mounted thereon, is lowered down onto the chassis platform 118 so that the lower interior components pass through the opening in the bottom of the body top-hat 114. The body top-hat 114 is then attached to the chassis platform 118 and/or the floor pan 170. The body top-hat 114 can be mounted to the frame members 154 and/or floor pan 170 via any suitable attachment process, such as bolts (not shown), adhesives, and/or welding. At this step in the assembly process, the large interior components are already assembled within the vehicle 110. Any additional, smaller trim components (not specifically shown) can then be installed as needed through the door openings of the body top-hat 114. The method then proceeds to step 30.

At step 30, after the body top-hat 114 is mounted to the chassis platform 118, the exterior final body panels 152 are attached to the exterior of the body top-hat 114. The exterior final body panels 152 can be pre-painted before being attached to the body top-hat 114. In an alternative configuration, not specifically shown, the exterior final body panels 152 can be attached to the body top-hat 114 before the body top-hat 114 is mounted on the chassis platform 118.

Unlike traditional vehicle construction methods (not shown), in which the vehicle's interior components 172 are all inserted through the door openings of the body structure, the method 10 allows for significantly greater flexibility and modularity of interior components 172 by not being limited by the size of the door openings. Instead, the lower components are assembled on the floor pan 170 and chassis platform 118 without the body structure getting in the way of the parts and/or installation tools or personnel. For example, articulating robot arms (not shown) no longer need to extend through the door openings in order to attach the components 172. Accordingly, such internal components 172 can be designed to be larger than the door openings as they need only fit through the large opening in the bottom of the body top-hat 114 structure. Similarly, large components such as the carpet sheet 176 and headliner no longer need to be bent, folded, or rolled up to be inserted through the door openings in order to be installed. Accordingly, different shapes, sizes, and materials can be used than in traditionally constructed vehicles (not shown). Furthermore, robotic arms and other tooling (not shown) can be larger and simpler, especially when the internal components 172 are mounted to the chassis platform 118 and/or the body top-hat 114 while these are advancing along a moving assembly line.

With reference to FIG. 2, a different method 210 of assembling the vehicle 110 is illustrated in flow chart format. The method 210 starts at step 214. At step 214, the body top-hat 114 is assembled and the chassis platform 118 is assembled separate from the body top-hat 114. For example, the body top-hat 114 and chassis platform 118 can be assembled on separate assembly lines.

Similar to method 10, the wheels 162, motors 158, and electric power storage unit 166 can all be assembled to the frame members 154 during step 214. Alternatively, some or all of these components (wheels 162, motors 158, electric power storage unit 166) can be assembled to the frame members 154 during a subsequent step. At step 214, the vehicle floor pan 170 and various internal components 172 can also formed separately from the chassis platform 118. The method 210 of assembling the vehicle 110 proceeds from step 214 to step 218.

At step 218, the lower interior components of the interior components 172 are assembled onto the floor pan 170 while the body top-hat 114 remains separate from the floor pan 170 and the floor pan 170 remains separate from the chassis platform 118. In the example provided, the carpet sheet 176 is positioned over the foot wells of the floor pan 170, the front and rear seats 174 are then attached to the floor pan 170, such as through openings in the carpet sheet 176, and the dash panel assembly 178 is attached to the floor pan 170. In an alternative configuration, the dash panel assembly 178 can be attached to the chassis platform 118 while the chassis platform 118 is still separate from the floor pan 170. In the example provided, the body top-hat 114 undergoes e-coating with a corrosion resistive coating during step 218. The method 210 then proceeds to step 222.

At step 222 the floor pan 170, with the lower interior components of the interior components 172 pre-mounted thereon, is securely mounted to the chassis platform 118. The floor pan 170 can be mounted to the frame members 154 via any suitable attachment process, such as bolts (not shown), adhesives, and/or welding. The floor pan 170 covers the entire top of the central frame cavity to cover the top of the electric power storage unit 166 and, in the example provided, extends over the rear wheels 162 to form a floor of a trunk or cargo area of the vehicle 110. In the example provided, the floor pan 170 also defines the support panel or members that extend upwards from the front foot well and is configured to support the dash panel assembly 178.

In the example provided, upper interior components of the interior components 172 are also assembled onto the body top-hat 114 while the body top-hat 114 is separate from the chassis platform 118 and floor pan 170 at step 222. For example, the headliner 180 is inserted into the body top-hat 114 through the opening in the bottom of the body top-hat 114 (i.e., between the left and right sills 146) and attached to the upper portion of the body top-hat 114 to form the ceiling of the vehicle 110. In the example provided, the pillar trim 182 is also attached to the corresponding pillars 122, 126, 130, 134 of the body top-hat 114 while the body top-hat 114 is separate from the chassis platform 118. In an alternative construction, not specifically shown, the dash panel assembly 178 can be considered an upper interior component and inserted through the bottom opening of the body top-hat 114 and then attached to the body top-hat 114 instead of being attached to the floor panel 170 and/or the chassis platform 118. Returning to the example provided, the body top-hat 114 and the upper interior components of the interior components 172 are still separate from the assembly of the chassis platform 118, the floor pan 170, and the lower interior components of the interior components 172. The method 210 of assembling the vehicle 110 proceeds from step 222 to step 226.

At step 226, the body top-hat 114, including the upper interior components mounted thereon, is lowered down onto the chassis platform 118 so that the lower interior components pass through the opening in the bottom of the body top-hat 114. The body top-hat 114 is then attached to the chassis platform 118 and/or the floor pan 170. The body top-hat 114 can be mounted to the frame members 154 and/or floor pan 170 via any suitable attachment process, such as bolts (not shown), adhesives, and/or welding. At this step in the assembly process, the large interior components are already assembled within the vehicle 110. Any additional, smaller trim components (not specifically shown) can then be installed as needed through the door openings of the body top-hat 114. The method then proceeds to step 230.

At step 230, after the body top-hat 114 is mounted to the chassis platform 118, the exterior final body panels 152 are attached to the exterior of the body top-hat 114. The exterior final body panels 152 can be pre-painted before being attached to the body top-hat 114. In an alternative configuration, not specifically shown, the exterior final body panels 152 can be attached to the body top-hat 114 before the body top-hat 114 is mounted on the chassis platform 118.

Similar to the method 10 (FIG. 1), the vehicle's larger interior components 172 are not all inserted through the door openings of the body structure, allowing for significantly greater flexibility and modularity of interior components 172 compared to traditional vehicle assembly methods (not shown). Accordingly, such interior components 172 can be designed to be larger than the door openings as they need only fit through the large opening in the bottom of the body top-hat 114 structure. Similarly, large components such as the carpet sheet 176 and headliner do not need to be bent, folded, or rolled up to be inserted through the door openings in order to be installed. Accordingly, different shapes, sizes, and materials can be used than in traditionally constructed vehicles (not shown). Furthermore, robotic arms and other tooling (not shown) can be larger and simpler, especially when the interior components 172 are mounted to the chassis platform 118 and/or the body top-hat 114 while these are advancing along a moving assembly line.

In an alternative configuration of the method 210, not specifically shown, steps 214 and 218 proceed as described above with reference to method 210. Then, unlike the method 210 of FIG. 2, step 222 can then be generally replaced by a step in which the body top-hat 114 is mounted to the floor pan 170 while the floor pan 170 is still separate from the chassis platform 118. Then, the assembly of the body top-hat 114 with the floor pan 170 and interior components 172 can be mounted to the chassis platform 118 at step 226 and step 230 can be as described above. In this alternative configuration, the larger lower interior components of the interior components 172 are still mounted to the floor pan 170 during step 218, while the floor pan 170 is separate from the body top-hat 114.

The methods 10 (FIG. 1) and 210 (FIG. 2) also allow for other variations, such as the upper portions (e.g., pillars 122, 126, 130, 134 and roof rail members 150) of the body top-hat 114 being assembled separately from the lower portions (e.g., longitudinal members 138, 142 and sill members 146) of the body top-hat 114. In such a configuration, the upper interior components of the interior components 172 can be attached to the upper portions of the body top-hat 114, then the lower portions of the body top-hat 114 can be attached to the upper portions of the body top hat 114.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle assembly method comprising:
   assembling a chassis platform;
   mounting a floor pan to the platform;
   mounting a lower interior component to the floor pan;
   assembling a body top-hat separate from the platform and the floor pan, the body top-hat including a left sill member and a right sill member, the left sill member defining a bottom of a door opening on a left side of the body top-hat, the right sill member defining a bottom of a door opening on a right side of the body top-hat;
   mounting an upper interior component to the body top-hat;
   mounting the body top-hat to the platform and the floor pan after mounting the lower interior component and the upper interior component.

2. The method of claim 1, wherein the lower interior component is mounted to the floor pan before the floor pan is mounted to the platform.

3. The method of claim 1, wherein the lower interior component is mounted to the floor pan after the floor pan is mounted to the platform.

4. The method of claim 1, wherein the step of mounting the lower interior component includes mounting at least one of a seat, a carpet, and an instrument panel to the floor pan.

5. The method of claim 1, wherein the step of mounting the lower interior component includes mounting a carpet, an instrument panel, and a plurality of seats to the floor pan.

6. The method of claim 1, wherein the step of mounting the upper interior component includes mounting at least one of a headliner, an airbag, and a finish trim piece to the body top-hat.

7. The method of claim 1, wherein the vehicle is an electric vehicle and the method further comprises mounting a plurality of electric storage devices to the platform before mounting the floor pan to the platform.

8. The method of claim 1, wherein the body top-hat is a space frame.

9. The method of claim 1, further comprising coating the floor pan with a corrosion resistant coating before mounting the body top-hat to the platform and the floor pan.

* * * * *